(12) United States Patent
Velasco-Dodge et al.

(10) Patent No.: US 10,788,858 B1
(45) Date of Patent: Sep. 29, 2020

(54) MODULAR CASE FOR ON DEMAND AUXILIARY COMPUTING DEVICE RESOURCES

(71) Applicants: Sean Paul Velasco-Dodge, Daly City, CA (US); Martin Kiyoshi Velasco, Daly City, CA (US)

(72) Inventors: Sean Paul Velasco-Dodge, Daly City, CA (US); Martin Kiyoshi Velasco, Daly City, CA (US)

( * ) Notice: Subject to any disclaimer, the term of this patent is extended or adjusted under 35 U.S.C. 154(b) by 0 days.

(21) Appl. No.: 16/459,216

(22) Filed: Jul. 1, 2019

Related U.S. Application Data

(63) Continuation-in-part of application No. 15/854,405, filed on Dec. 26, 2017, now abandoned.

(60) Provisional application No. 62/438,768, filed on Dec. 23, 2016.

(51) Int. Cl.
*G06F 1/16* (2006.01)
*G06F 1/20* (2006.01)

(52) U.S. Cl.
CPC .......... *G06F 1/1632* (2013.01); *G06F 1/1684* (2013.01); *G06F 1/20* (2013.01)

(58) Field of Classification Search
CPC .................................................... G06F 1/1632
USPC .................... 361/679.41, 679.46, 679.48
See application file for complete search history.

(56) References Cited

U.S. PATENT DOCUMENTS

| | | | | |
|---|---|---|---|---|
| 8,724,314 B2* | 5/2014 | Pais | ...................... | G06F 1/1632 165/80.3 |
| 9,178,976 B2* | 11/2015 | Djordjevic | ............ | G06F 1/1626 |
| 2012/0054401 A1* | 3/2012 | Cheng | ................... | G06F 1/1632 710/304 |
| 2012/0327581 A1* | 12/2012 | Pais | ...................... | G06F 1/1632 361/679.26 |
| 2014/0111935 A1* | 4/2014 | Ito | ............................. | G06F 1/20 361/679.48 |
| 2016/0187924 A1* | 6/2016 | Fan | ........................ | G06F 1/1624 361/679.56 |

\* cited by examiner

*Primary Examiner* — Anthony Q Edwards
(74) *Attorney, Agent, or Firm* — Plager Schack LLP; Mark H. Plager; Alexis J. Saenz

(57) ABSTRACT

A case for computing devices includes an interface which provides connection to a plurality of auxiliary hardware resources. The plurality of auxiliary hardware resources may be mounted in the case. The case may also include space to accommodate the computing device in the case frame. As computing demands increase for the computing device, the computing device may be connected to the case frame's interface, which via an electrical bus, connects the computing device to one or more of the auxiliary hardware resources in the case. In some embodiments, the auxiliary hardware resources may be accessed by the user on-demand. In some embodiments, a cooling fan may cool the ambient temperature of the case and/or individual auxiliary pieces of hardware.

3 Claims, 2 Drawing Sheets

MODULAR CASE FOR ON DEMAND AUXILIARY COMPUTING DEVICE RESOURCES

CROSS-REFERENCE TO RELATED APPLICATIONS

This application claims priority to U.S. application Ser. No. 15/854,405 filed Dec. 26, 2017 and is currently pending and which in turn claims the benefit of the priority date of provisional patent application U.S. Ser. No. 62/438,768 filed on Dec. 23, 2016, the entire contents of which, including drawings and specifications are herein incorporated by reference.

BACKGROUND

The embodiments described herein relate generally to computer accessories, and more particularly, to a modular case for on demand auxiliary computing device resources.

In the field of computer packaging and design, there is commonly a struggle between balancing the consumer's desire for more options versus the challenge of providing computing performance within lighter and thinner computing cases. Laptops and tablet computing devices especially try to appease the consumer's desire for thinner and lighter devices in light of their use as portable devices often carried everywhere a person travels.

Typically, the consumer must evaluate computers for computing power, data ports, weight and screen size before purchasing. Often other performance factors may also be compared. Unlike desktop towers which may be easily opened and the motherboard accessed to replace components, laptops and tablets are designed by their compact packaging to remain unmodified after manufacturer assembly. Once the computer is purchased, consumers rarely open the casing up to add for example, memory, ports or other features because doing so is a delicate sequence of steps involving prying one component from another with small ribbon cables attached and risks damage to the device. Instead, most users are faced with needing to buy several different externally plugged into peripherals to add a piece of hardware capability (for example, an external hard drive or optical reader) via one of the computer's limited number of ports. Typically, some devices only have between 1-3 ports available to plug in a peripheral which leaves the user with difficult choices as to which item to plug in. For example, if one needs to use an external optical reader, sometimes one needs to unplug their mouse and proceed based on the use of a touch sensitive screen which can be cumbersome.

As a result, once the device is purchased, the computing power, battery capability, peripherals included, etc. are usually set for the life of the computer. However, the user's computing needs tend to grow the longer the ownership of the computer. The user is thus faced with the prospect of continuing to use a computer with increasingly inadequate resources or purchase an entirely new system.

In addition, when connecting some devices to an auxiliary case, the temperature control for the original device is not considered. As a result, the original device may suffer from heat building up in the auxiliary case which causes poor performance or failure in the original device.

As can be seen, there is a need for an apparatus that allows one to interface auxiliary resources to a computer on demand.

SUMMARY

In one aspect of the disclosure, a docking case for receiving a computing device comprises a case frame; a computer socket mounted to the case frame, the computer socket configured to connect with and communicate through an I/O port of the computing device; an electrical bus system in the case frame connected to the computer socket; a plurality of auxiliary computer resource hardware mounted within the case frame, wherein: the plurality of auxiliary computer resource hardware is electrically connected to the computer socket via the electrical bus system, the plurality of auxiliary computer resource hardware includes at least a battery and a data storage device, and the case frame is not a part of the computing device; a fan mounted to the case frame; and a temperature sensor connected to the fan, wherein the fan is triggered to vent hot air from the case frame in response to the temperature sensor detecting an ambient temperature in the case frame exceeding a threshold temperature level.

In another aspect, a docking case for receiving a computing device comprises a case frame; a computer socket mounted to the case frame, the computer socket configured to connect with and communicate through an I/O port of the computing device; an electrical bus system in the case frame connected to the computer socket; a plurality of auxiliary computer resource hardware mounted within the case frame, wherein: the plurality of auxiliary computer resource hardware is electrically connected to the computer socket via the electrical bus system, the plurality of auxiliary computer resource hardware includes at least a battery, a processing unit, and a data storage device, and the case frame is not a part of the computing device; a fan mounted to the case frame; a temperature sensor connected to the fan and connected to at least one of the battery, the processing unit, and the data storage device, wherein the fan is triggered to vent hot air from the case frame in response to the temperature sensor detecting a threshold temperature level exceeding a stored temperature level for the battery, the processing unit, or the data storage device; and a user selectable button configured to manually operate the fan to cool down the case frame for the user's comfort.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed invention provide a case configured for receiving a laptop or tablet computing device and which provides auxiliary computer resources on demand. On some embodiments, hardware resources are modularly mounted to the case so that upgrading a hardware resource is convenient by replacing one item with the same type of item but with better performance. As used herein "computer resources" refers to hardware components.

Figure 1:
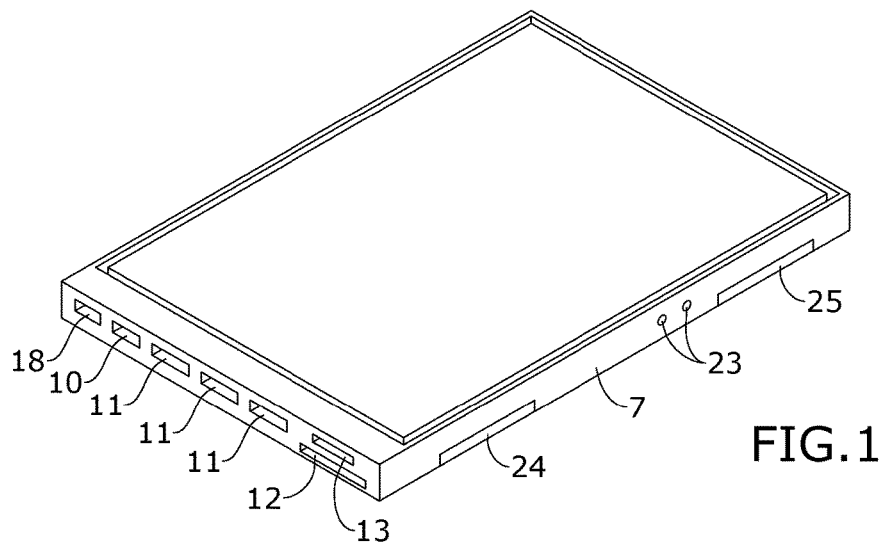
FIG. 1 is a top, front perspective view of a case with a computer docked according to an embodiment of the subject technology.
Figure 2:
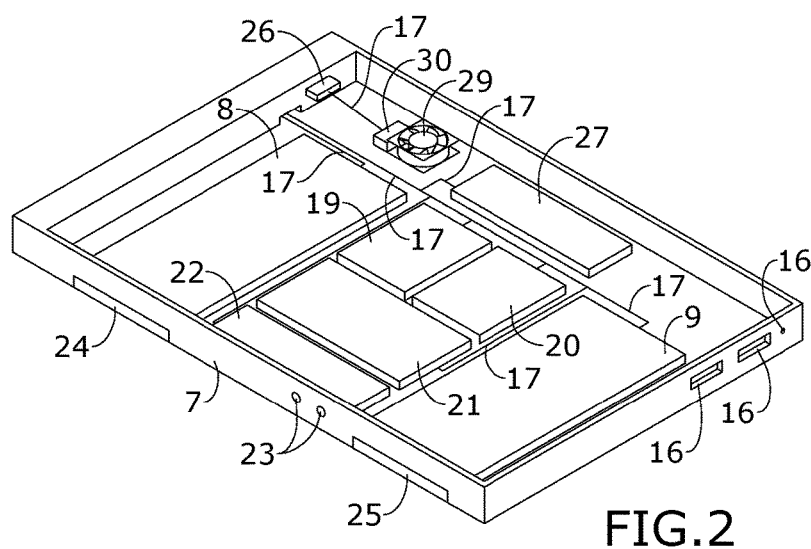
FIG. 2 is a top, right side perspective view of the case of FIG. 1 without the computer present.
Figure 3:
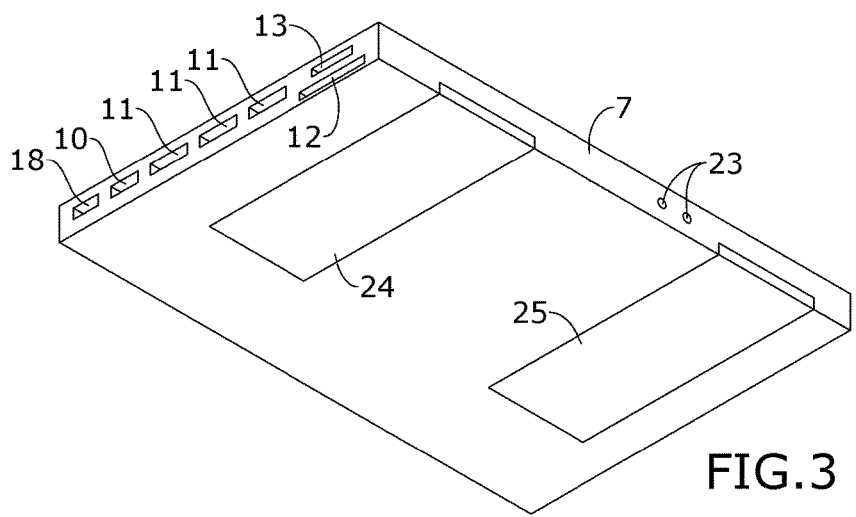
FIG. 3 is a bottom perspective view of the case of FIG. 1.
Figure 4:
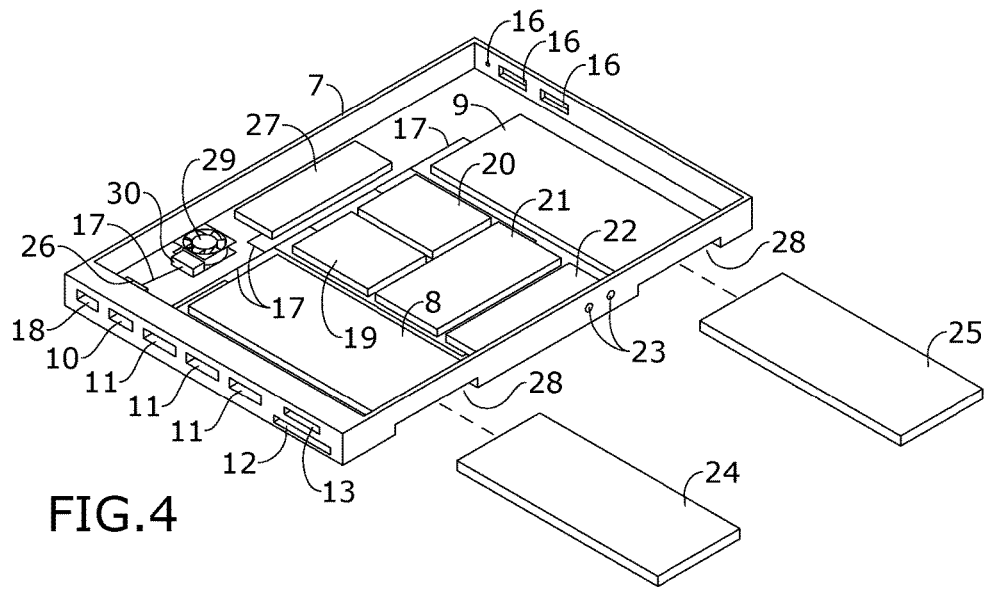
FIG. 4 is an exploded view of the case of FIG. 2 with some auxiliary resources detached from the case.
Figure 5:
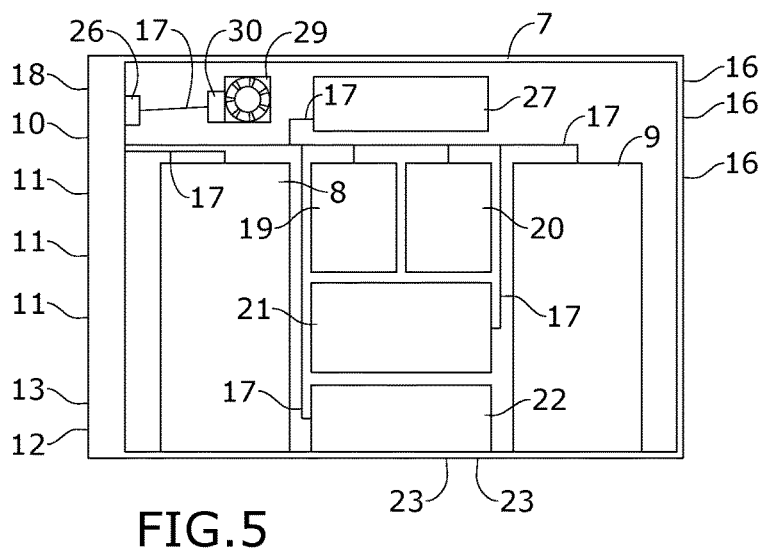
FIG. 5 is a top view of the case of FIG. 2.
Figure 6:
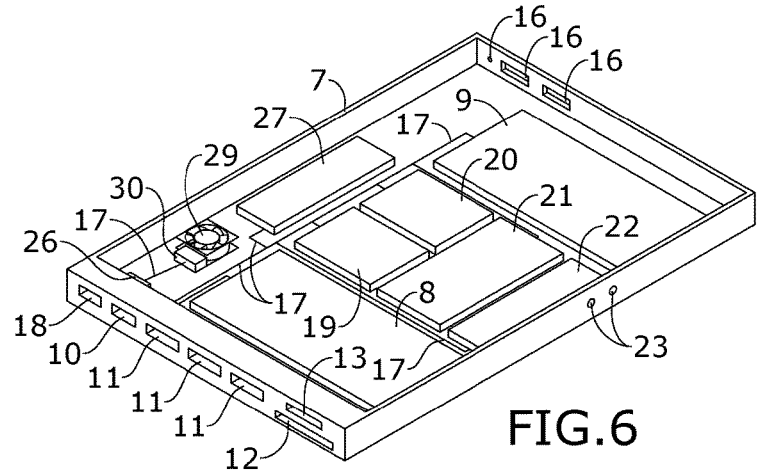
FIG. 6 is a top, front perspective view of a case with a computer docked according to an embodiment of the subject technology.

By way of example and as shown in FIGS. 1-6, a case 7 for providing auxiliary hardware resources to a computing device is shown according to an exemplary embodiment. The case 7 may include an open-top frame with vertical walls projecting up from a base so as to accommodate auxiliary computing hardware and the computing device simultaneously within the frame (for example, as shown in FIG. 1). The computing device may in some embodiments be a mobile device including for example, a laptop computer, a tablet computer, or a smart phone. While the below is described in the context of one of these computing device types, it will be understood that the case construction may be re-arranged to accommodate different computing device types without departing from the scope of protection.

The case 7 includes an interface 26 that is configured to connect to and communicate with an I/O port (not shown) of the computing device. In an exemplary embodiment, the interface 26 is a computer socket. Some embodiments of the computer socket include a male plug which may be inserted into the female end of the computing device's port. In some embodiments, the interface 26 is higher up one of the vertical walls of the case frame so that when the computing device is docked, the computing device rests above the auxiliary hardware resources when connected to the interface 26. In some embodiments, the interface 26 may be a parallel port. As may be appreciated, this provides similar handling and convenience of the device's normal use (for example, when being operated on one's lap) without the need to connect different external pieces of hardware.

The case 7 may include a plurality of different types of auxiliary hardware to provide the auxiliary resources. While not shown for sake of illustration, the case 7 includes an interface between an electrical bus system 17 and each one of the electrical components described. They are generally referred to as a whole as hardware resources and may include: a battery 8, a data storage device 9 (for example, a hard drive, flash drive, or other recording medium), random access memory (RAM) module 19, solid state drive (SSD) 20, graphics processing unit (GPU) 21, audio card 22, and a network module 27 (which may be for example, an Ethernet connection, a wireless radio module, and/or a short range wireless module). One or more of these resources may be modularly mounted into the case 7 via a removable tray. In one embodiment, a battery tray 24 holds the battery 8 or its replacement and a data storage device tray 25 holds the data storage device 9 or its replacement, in one of tray slots 28, which may be mounted onto the base of the case 7. In some embodiments, hardware not mounted via tray may be mounted by other means such as plug and play modules. In some embodiments, the hardware may include a plurality of ports 11 (for example USB, HDMI, etc.), memory card slots 12, mini-memory card slots 13, and audio input ports 23 (which may be connected in some embodiment to the audio card 22) may be mounted to the vertical walls of the frame, each of which may also be connected to the bus system 17 and interface 26 with wiring within a bulkhead that is part of the case 7 frame (and thus, which is hidden from view). The case 7 may also include in some embodiments, a through port 10) which may provide for example, a power cord opening so that the computing device may remain plugged into a wall outlet rather than use battery). Some embodiments may also include open ports 16 and 18 which may not include a socket yet but are connected to the electrical system bus 17 so when the user wishes to add a port connector, the socket is ready to use by simply plugging the socket into the open port.

In an exemplary embodiment, the case 7 may include a cooling fan 29 and a temperature sensor 30 coupled to the cooling fan. The temperature sensor 30 may monitor the ambient temperature in the case 7. In some embodiments, operating software for the case 7 may store threshold operating temperatures for the computing device connected to the case 7 and for auxiliary components currently in operation in the case 7. In operation, once either an ambient temperature for the case 7 exceeds a threshold level for the computing device docked to the case 7, or a threshold temperature for overall operating of components in the case 7, or a threshold temperature for any specific auxiliary component, the fan 29 may be triggered to vent hot air out of the case 7.

In some embodiments, there may be more than one temperature sensor 30 present in the case 7. For example, one or more of the auxiliary components may have a temperature sensor 30 connected to or in proximity of the auxiliary component. In embodiments with modular auxiliary hardware, the bus system 17 may connect the temperature sensor 30 of the modular piece of hardware to through a connection point to the modular element (for example, a plug in a removable tray). In the event the threshold temperature is based on an associated piece of auxiliary hardware, the fan 29 may operate until the temperature sensor 30 registers a temperature for the associated auxiliary component dropping back down under the threshold temperature for safe operation. As may also be appreciated, software viewable through the docked computing device may also alert the user through a display when a piece of auxiliary hardware is overheating. As will be appreciated, the user may unplug the piece of auxiliary hardware (either by disconnecting access to the piece of auxiliary hardware through the software or by physically removing the tray from the case 7). For sake of illustration, a vent is not shown will be understood to be present in either a sidewall adjacent the fan 29 or underneath the fan 29 in the case bottom wall.

Moreover, in some embodiments, the software may allow the user to set a temperature level so that the case 7 does not become so hot that the case 7 is uncomfortable to hold or rest on a user's person during use. Still yet, in another embodiment, the case 7 may include a manual button that a user may press to trigger operation of the fan 29 in case the case 7 begins to feel too hot for comfort. As will be appreciated, the cooling aspect of the disclosure allows a computing device to be augmented with auxiliary hardware and function for extended periods as the auxiliary hardware and original computing device's hardware do not overheat. In addition, the manual fan operation allows a user to selectively trigger the fan 29 based on their own subjective tolerance to heat when the case 7 is used resting on the person such as in a sitting position with the case 7 on the person's lap.

In practice, the I/O port of the computing device has access to the computing device's CPU. When the user wishes to access auxiliary resources from the case 7, some embodiments may include a user interface screen and software that allows the user to control when the auxiliary hardware resources are accessed and may, for example, selectively trigger resource use on-demand as necessary. Otherwise, in some embodiments, the auxiliary hardware resources may always be on which in effect, provides the user with an upgraded version of their computing device. Communication and power access between the computing device and the hardware resources in the case 7 may be provided by the electrical bus system 17 of traces and wiring. Each hardware resource may be connected to the electrical bus system 17 which is connected to the interface 26. As the computing device needs access to one or more of the hardware resources, the computing device's CPU may send the signal through the interface 26 and through the bus system 17 to the resource. In some embodiments, the case 7 or the computing device may include firmware or software resident that provides a clocking mechanism or a multiplexer module that coordinates signaling between each of the hardware resources and the computing device along the electrical bus system 17.

As will be appreciated, as a user's computing device slows down, becomes less powerful or is otherwise not able to keep up with higher computing demands, the case 7 will help the computing device access auxiliary resources without having to modify the computing device itself. In addition, it will also be appreciated that the case 7 may unexpectedly make a computing device more flexible because the auxiliary hardware resources in the case 7 may be modular and thus can easily be swapped in and out to customize and optimize the resource needs for an application. For example, as will be seen, some applications require more processing power but not necessarily more graphics performance. In response, a faster central processing unit may be inserted into the case 7 while a less powerful graphics processing unit may be swapped in for a current GPU mounted into the case 7. As a result, the application is provided faster processing (for example, for data mining or processing) while the better GPU's lifespan is extended. Should the user need to switch the computing device setup to a faster graphics processing application, (for example, competitive online gaming), the better GPU may be re-inserted at will.

It will also be appreciated that by connecting the various ports (11 and 23, and slots 12 and 13) along an in-common bus to the interface 26, computing devices docked into the case 7 also receive the benefit of increased port availability to add any other external devices as needed without having to disconnect one peripheral for the other.

Aspects of the modular case may augment computer resources or be used as substitute components becoming the "master" device of the resource type while the OEM part may become the "slave", a secondary device, or left dormant at the user's discretion. Thus, unexpectedly, the case 7 provides a major increase in flexibility and computing resources for devices that have been heretofore difficult to upgrade or augment.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A docking case for receiving a computing device, comprising:
    a case frame;
    a computer socket mounted to the case frame, the computer socket configured to connect with and communicate through an I/O port of the computing device;
    an electrical bus system in the case frame connected to the computer socket;
    a plurality of auxiliary computer resource hardware mounted within the case frame, wherein:
        the plurality of auxiliary computer resource hardware is electrically connected to the computer socket via the electrical bus system,
        one or more of the plurality of auxiliary computer resource hardware is modularly mountable to the case frame via a removable tray, and the removable tray is connectable to the electrical bus system,
        the plurality of auxiliary computer resource hardware includes at least a battery, a processing unit, and a data storage device, and
        the case frame is not a part of the computing device;
    a fan mounted to the case frame; and
    a temperature sensor connected to the fan and connected to at least one of the battery, the processing unit, and the data storage device, wherein the fan is triggered to vent hot air from the case frame in response to the temperature sensor detecting a threshold temperature level exceeding a stored temperature level for the battery, the processing unit, or the data storage device, and wherein the temperature sensor is connected to the one or more of the plurality of auxiliary computer resource hardware through a connection point in the removable tray.

2. The case of claim 1, further comprising software configured to display an alert on the computing device indicating overheating of the one or more of the plurality of auxiliary computer resource hardware.

3. The case of claim 2, wherein the software is configured to disconnect access of the computing device from the one or more of the plurality of auxiliary computer resource hardware.

* * * * *